US011586476B2

(12) United States Patent
Arora et al.

(10) Patent No.: US 11,586,476 B2
(45) Date of Patent: Feb. 21, 2023

(54) RESOURCE SHARING IN A MULTI-CORE SYSTEM

(71) Applicant: NXP USA, Inc., Austin, TX (US)

(72) Inventors: Mohit Arora, Austin, TX (US); Milton Hissasi Kataoka, Sao Paulo (BR); Marcos da Costa Barros, Sao Paulo (BR); Tuongvu Van Nguyen, Austin, TX (US); Rob Cosaro, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/303,207

(22) Filed: May 24, 2021

(65) Prior Publication Data

US 2022/0374279 A1 Nov. 24, 2022

(51) Int. Cl.
*G06F 9/50* (2006.01)
*G06F 1/24* (2006.01)
*G06F 13/24* (2006.01)

(52) U.S. Cl.
CPC .............. *G06F 9/5061* (2013.01); *G06F 1/24* (2013.01); *G06F 13/24* (2013.01)

(58) Field of Classification Search
CPC .................................. G06F 1/24; G06F 13/24
USPC ............................................................ 713/1
See application file for complete search history.

(56) References Cited

U.S. PATENT DOCUMENTS

| 9,874,910 | B2 | 1/2018 | Thomas et al. |
| 10,255,118 | B2* | 4/2019 | Yu ........................... G06F 9/5088 |
| 10,289,785 | B1* | 5/2019 | Panou ................. G06F 9/44505 |
| 11,366,488 | B1* | 6/2022 | Arora ..................... G06F 1/3287 |
| 2016/0085279 | A1 | 3/2016 | Culshaw et al. |
| 2016/0182398 | A1* | 6/2016 | Davis .................... H04L 47/782 |
| | | | 710/313 |
| 2019/0324806 | A1* | 10/2019 | Javre ...................... G06F 30/39 |

* cited by examiner

*Primary Examiner* — Brian T Misiura

(57) ABSTRACT

An integrated circuit includes a primary initiator domain (ID) circuit including having a processor core, a responder domain (RD) control circuit, and a reset controller. Secondary ID circuits, each include a processor core and a reset controller. RD circuitry is coupled to communicate with the primary ID circuit and the secondary ID circuits and includes RD resource circuits. The RD control circuit is configured to allocate each of the RD resource circuits to a first initiator domain consisting of the primary ID circuit or one of the secondary ID circuits, and when one of the secondary ID circuits enters a reset mode of operation, the RD resource circuit allocated to the one of the secondary ID circuits enters a reset while the remaining RD resource circuits are not affected by the reset.

18 Claims, 2 Drawing Sheets

RESOURCE SHARING IN A MULTI-CORE SYSTEM

BACKGROUND

Field

This disclosure relates generally to multi-core systems, and more specifically, to resource sharing in multi-core systems having multiple domains running different operating systems.

Related Art

An asymmetric multiple core (i.e. multi-core) system is one in which two or more initiator domains, each having one or more cores, operate using different operating systems. Within such a system, one initiator domain may need to access resources from another initiator domain. Unfortunately, this enforces a restriction in which the complete initiator domain including the needed resource to be kept active. This results in adverse power implications by keeping un-necessary circuits active.

For example, an initiator domain running a Linux™ based operating system (OS), e.g., Linux on Application, may include a graphics processing unit (GPU), and another initiator domain running a real time operating system (RTOS) may need GPU services. In this example, since the GPU belongs to the Linux-based initiator domain, it is necessary to maintain the entire Linux-based initiator domain active, in order to keep the GPU available to the RTOS initiator domain. This adversely impacts the power consumption of the entire system on a chip (SoC), and this is especially problematic in battery-powered applications, such as in wearables, due to reduction in battery-life. Therefore, a need exists for improved resource sharing in multi-core systems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a multi-core system includes N initiator domains and a responder domain. Each initiator domain runs a complete operating system (OS), such as, for example, a Linux™ based OS or an RTOS. In addition to the initiator domains, the system also includes a responder domain (also referred to as a responder-only domain) which is a separate domain from the initiator domains and includes resources which can be shared by the initiator domains. The responder domain does not run its own operating system and therefore cannot initiate any original or high level requests to any initiator domain, but can only respond to requests made by the initiator domains, including initiating transactions on behalf of an initiator domain in the process of responding to a request from the initiator domain. One of the initiator domains is designated a primary initiator domain which controls configuration of the responder domain.

Each of the resources in the responder domain can be allocated (i.e. assigned) to one of the initiator domains. This allocation allows for adaptive reset handling in which it is possible for some of the resources within the responder domain to continue to function while the rest of the resources gets reset if the initiator domain to which the portion is allocated gets reset. Also, peripheral and DMA interrupts within the responder domain are routed to the appropriate initiator domain based on the allocation of resources within the responder domain. The primary initiator domain owns these configurations of the responder domain, and by using these configurations, reduced system power consumption may be achieved.

Figure 1:
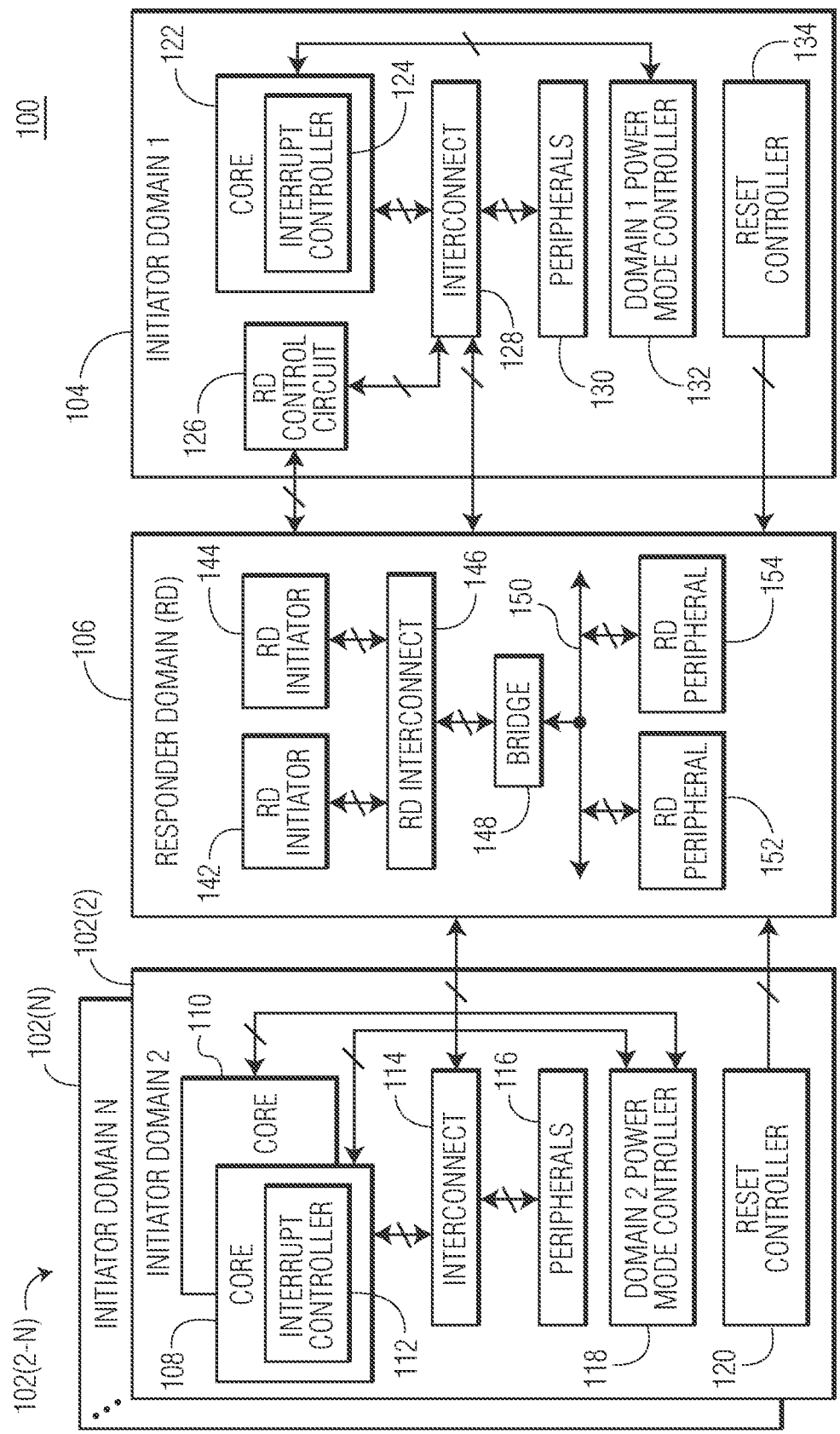
FIG. 1 illustrates, in block diagram form, a multi-core system in accordance with one embodiment of the present invention.

FIG. 1 illustrates, in block diagram form, a system 100 (which may be implemented as a system on a chip (SoC) 100, in accordance with one embodiment of the present invention. System 100 includes N initiator domains (including initiator domain 1 104 and initiator domains 102(2-N)) and a responder domain (RD) 106. Initiator domain 2 102(2) (which can simply be referred to as initiator domain 2 or domain 2) includes multiple cores (core 108 and core 110), an interconnect 114, one or more peripherals 116, a domain 2 power mode controller 118, and a reset controller 120. Cores 108 and 110 are coupled to interconnect 114, domain 2 power mode controller 118, and reset controller 120. Peripherals 116 are coupled to interconnect 114. Cores 108 and 110 can be any type of cores, and initiator domain 2 may include any number of cores. Core 112 includes an interrupt controller 112. In one embodiment, core 110 is similar to core 112, including similar elements. Interconnect 114 may be any type of interconnect, such as, e.g., a bus, cross-bar switch, or other type of interconnect fabric, and peripherals 116 can include any number and type of peripherals.

Initiator domain 1 104 (which can simply be referred to as initiator domain 1 or domain 1) includes a core 122, and RD control circuit 126, an interconnect 128, one or more peripherals 130, a domain 1 power mode controller 12, and a reset controller 134. Similar to initiator domain 2, domain 1 may include any number of cores, and each core can be any type of core. Core 122 also includes an interrupt controller 124. Also, interconnect 128 may be any type of interconnect, such as, e.g., a bus, cross-bar switch, or other type of interconnect fabric, and peripherals 130 can include any number and type of peripherals.

Each initiator domain runs a corresponding OS, in which different initiator domains can run different operating systems. System 100 is an asymmetric multi-core system meaning that it includes at least two initiator domains operating according to at least two different operating systems. For example, initiator domain 1 may correspond to a real time domain operating using a real time operating system (RTOS), while initiator domain 2 may be an application domain operating using an OS such as an Android™ or Linux™ based OS (in which Android™ is a trademark of Google LLC and Linux™ is a trademark of Linus Torvalds). Therefore, domain 1 power mode controller controls the power modes of the elements within initiator domain 1 in accordance with its corresponding OS (e.g. RTOS), and domain 2 power mode controller controls the power modes of the elements within initiator domain 2 in accordance with its corresponding OS (e.g. Linux). For example, each OS can define various power modes, such as, for example, sleep modes, low power modes, active modes, etc.

System 100 may include any number of additional initiator domains 102(3-N) in which each domain operates with its corresponding OS, and each may have, for example, their own one or more cores, interconnect, peripherals, power mode controller, reset controller, etc. Also, note that the initiator domains of FIG. 1 are merely examples, and each initiator domain may include additional elements, fewer elements, or different elements than as illustrated. For example, an initiator domain may not include any peripherals.

RD 106 of system 100 includes any number of RD initiators, such as RD initiator 142 and RD initiator 144, an RD interconnect 146, a bridge 148, a peripheral bus 150, and any number of RD peripherals, such as RD peripheral 152 and RD peripheral 154. The RD initiators (also referred to as RD initiator circuits) are coupled to RD interconnect 146, which is coupled via bridge circuit 148 to peripheral bus 150. The RD peripherals (also referred to as RD peripheral circuits) are coupled to peripheral bus 150. The RD initiators can be any type of initiators, such as, for example, a GPU, a direct memory access (DMA) controller, a 2D or 3D GPU, a display controller, a camera interface, a digital signal processing (DSP) core, etc. RD interconnect 146 can be any type of interconnect, such as, e.g., a bus, cross-bar switch, or other type of interconnect fabric. RD peripherals can be any type of peripherals, such as, for example, a memory (e.g. an on-chip memory or a dual data rate (DDR) memory), a communications port, an 12S interface, timers, a messaging unit (MU), etc. As with the initiator domains, RD 106 may include additional elements, fewer elements, or different elements than those illustrated in FIG. 1. Note that RD initiators and RD peripherals may also be referred to as RD resources or RD resource circuits.

The initiator domains are capable of initiating original or high level requests to other domains, such as to resources of other domains. Note that an original or high level request is a request that originates within an initiator domain in accordance with an operating system of that initiator domain. A high level request by an initiator domain may also require multiple transactions in obtaining a response. The responder domain responds to the original or high level requests initiated by the initiator domains (i.e. to requests originated within initiator domains), and since a responder domain does not have its own operating system, it cannot initiate or request high level transactions to other domains to begin with. However, the responder domain can initiate transactions to resources within its domain or to resources of other initiator domains on behalf of an initiator domain in the process of responding to a request from that initiator domain. In this manner, a responder domain can only respond to high level requests but cannot itself initiate a high level request.

Referring to RD 106, the shared resources within RD 106 (e.g. RD initiator 142 and RD initiator 144) can be accessed by the initiator domains. The RD initiators in RD 106 are initiators which can provide requests to resources within RD 106, such as to any of the RD peripherals, or may provide requests to other resources in initiator domains on behalf of an initiator domain. In one embodiment, one of the initiator domains can program a resource in RD 106 such that the resource in RD 106 can react and request data from other initiator domains when necessary in responding to a request from that initiator domain. For example, one of the RD initiators in RD 106 may be a GPU which can be programmed by domain 2 (e.g. an application domain) such that the GPU in RD 106 can then initiate a transaction to access a DMA in domain 1 (e.g. a real time domain) to copy data into its own domain (RD 106) so that the GPU can then render and route the data to a display. Therefore, while an RD initiator can be programmed to react and request information from other domains, it cannot initiate any requests or transactions on its own (without having first been programmed to do so by an initiator domain).

As will be described in more detail below, each resource of RD 106 can be allocated (i.e. assigned) to a particular initiator domain, as configured by a primary initiator domain. In the illustrated embodiment, initiator domain 1 is the primary initiator domain (which may simply be referred to as the primary domain) and includes RD control circuit 126 which allows for the configuration of the resources in RD 106, as will be described in reference to FIG. 2. In one embodiment, only one initiator domain (i.e. the primary initiator domain) can control the configuration of RD 106, which includes any initialization or clock settings of RD 106. Also, unlike the initiator domains which are each associated with a specific operating system (e.g. Linux or RTOS) and therefore includes its own power modes, RD 106 does not run its own complete OS and therefore does not have its own power modes. Instead, RD 106 follows the power modes of the primary domain, and resources within RD 106 can follow the power modes of the corresponding initiator domains. For example, when a particular initiator domain enters a low power mode in accordance with its OS, those resources in RD 106 allocated to that particular initiator domain can also enter a lower power mode. Note that before any of the non-primary initiator domains transitions to a low power mode, they should ensure that any required clocks to RD 106 are properly gated prior to the power mode transition.

Figure 2:
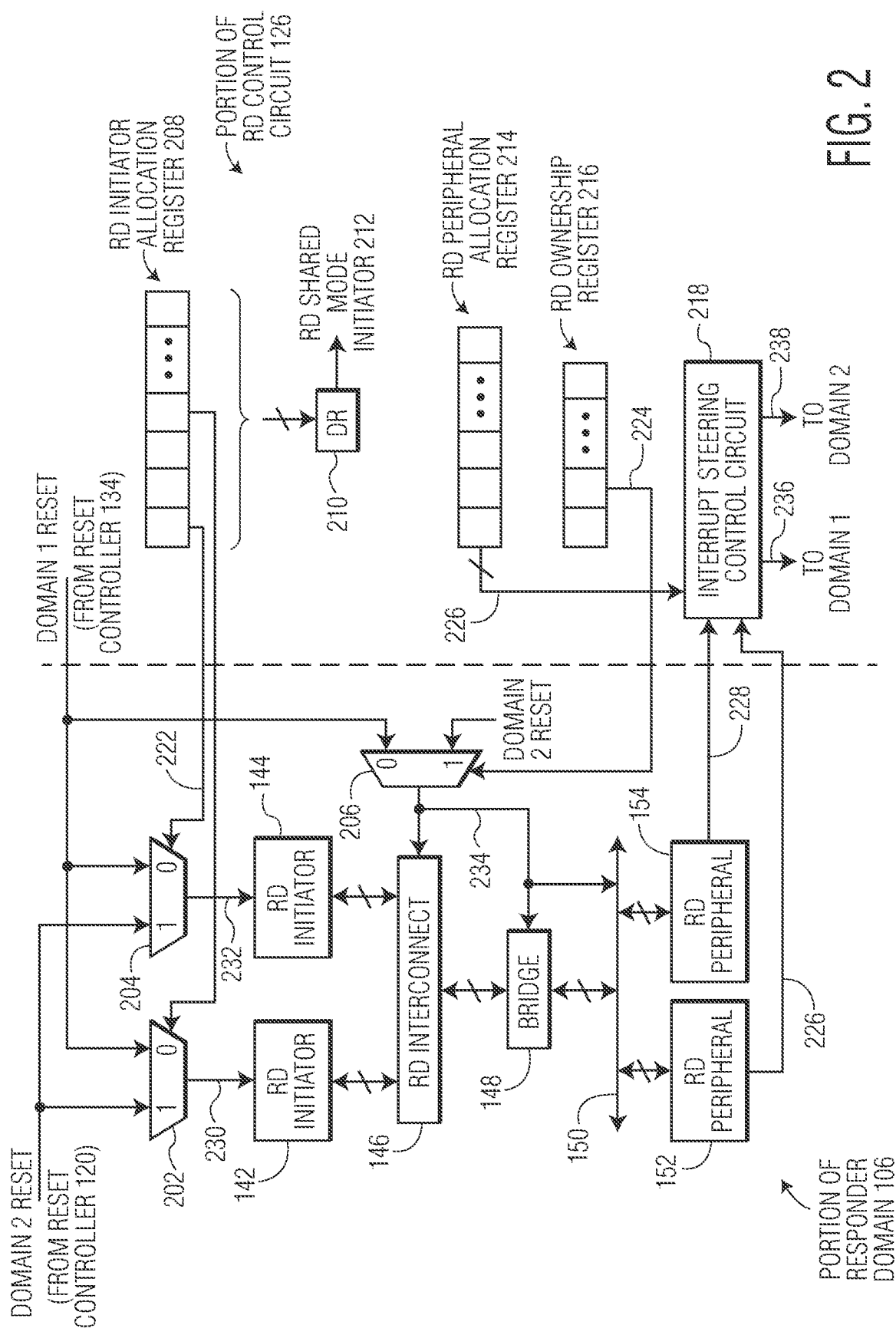
FIG. 2 illustrates, in block diagram form, a portion of an initiator domain and a responder domain of FIG. 1, in accordance with one embodiment of the present invention.

FIG. 2 illustrates, in block diagram form, a more detailed view of RD 106 as well as RD control circuit 126 in the primary domain, in accordance with one embodiment of the present invention. In one embodiment of system 100, RD 106 comes up as "disabled" by default during boot-up of system 100 and needs to be explicitly enabled. This can be done using a dedicated fuse bit which can enforce a default allocation of an initiator domain (e.g. domain 1) as the primary domain controlling RD 106. As will be discussed in more detail below, the primary domain can be switched from domain 1 to a different initiator domain by various software methods (however, any initiator domain being selected as a primary domain needs to have the appropriate control circuitry, such as RD control circuit 126, to properly configure and control the responder domain).

Even though the configuration of RD 106 is managed by the primary domain, any of the resources within RD 106 (including RD initiators and RD peripherals, which may also be referred to as RD resources or RD resource circuits) can be considered as shared resources which can be accessed by any initiator domain based on how they are allocated. Since the initiator domains are each running with their own OS (and the operating systems can be different types), the allocation of resources in the responder domain to different initiator domains allows RD 106 to be part of multiple operating systems. In this manner, resources can be run independently, providing the ability for power and performance trade-offs.

For example, RD control circuit 126 in the primary domain includes an RD initiator allocation register 208 and an RD peripheral allocation register 214. Each field of RD initiator allocation register 208 corresponds to an RD initiator of RD 106, and is set to allocate (i.e. assign) the RD initiator to an initiator domain. Similarly, each field of RD peripheral allocation register 214 corresponds to an RD peripheral of RD 106, and is set to allocate (i.e. assign) the RD peripheral to an initiator domain. In the illustrated embodiment of FIG. 2, it will be assumed that only two initiator domains are in system 100 (initiator domains 1 and 2). Therefore, each field of RD initiator allocation register 208 and each field of RD peripheral allocation register 214 can be a single bit value that is set to "0" if allocated to domain 1 or to "1" if allocated to domain 2. If there were more initiator domains (e.g. N initiator domains), then each field of registers 208 and 214 would include multiple bits to differentiate among the N initiator domains. RD control circuit 126 also includes an RD ownership register 216 which identifies which initiator domain is designated as the primary initiator domain. The registers of RD control circuit 126 may be accessed based on how security firewalls are configured in the system. For example, they may be programmable by secure privileged code of a domain. By changing the values in RD initiator allocation register 208 or RD peripheral allocation register 214, each RD initiator or RD peripheral can be reallocated (i.e. re-assigned) to a different initiator domain. This reallocation may be done, for example, upon a context switch within an initiator domain. Note that each of the illustrated registers can be any type of storage circuitry and may include any number of fields and bits, as needed, to indicate the proper initiator domain allocations.

By using the configuration set up by RD control circuit 126, the resets of the resources within RD 106 are decoupled so as to allow for adaptive reset handling. For example, when an initiator domain resets, only the resources allocated to that initiator domain are reset, while the rest of the resources continue to operate with other active initiator domains. However, if the primary domain is reset, all resources in the slave domain are reset, regardless of how they are allocated.

Referring to the illustrated embodiment of FIG. 2, RD control circuit 106 includes multiplexers (MUXes) 202, 204, and 206 to handle this adaptive resetting. For example, MUX 202 receives a domain 2 reset (from reset controller 120 of domain 2) at a first data input and receives domain 1 reset (from reset controller 134 of domain 1) at a second data input. A control input of MUX 202 receives an indicator 220 from the field of allocation registers 208 which corresponds to RD initiator 142. In the illustrated example of FIG. 2 (assuming only two initiator domains are present), the field of allocation register 208 corresponding to RD initiator 142 is either a 1 or a 0. If RD initiator 142 is allocated to domain 2, indicator 220 is a 1 and thus the domain 2 reset is provided as reset 230 to a reset input of RD initiator 142. If RD initiator is allocated to domain 1, indicator 220 is instead provided as a 0 and thus the domain 1 reset is provided as reset 230 to RD initiator 142. A similar description applies to MUX 204 in which indicator 222 is received by a control input of MUX 204 from the field of allocation register 208 corresponding to RD initiator 144. Therefore, if RD initiator 144 is allocated to domain 2, MUX 204 provides the domain 2 reset as reset 232 to a reset input of RD initiator 144, and if allocated to domain 1, MUX 204 provides the domain 1 reset as reset 232 to RD initiator 144. Therefore, RD initiator allocation registers 208 controls the routing of reset signals from the initiator domains to the reset input of the appropriate RD initiator of RD 106.

In alternate embodiments, such as when there are N initiator domains, each MUX would include N inputs, and the control inputs of the MUXes would be multiple bit control signals based on the field of register 208 which corresponds to the corresponding RD initiator. The reset inputs of the RD initiators may correspond to software reset inputs, and are each decoupled from the reset inputs of other RD initiators. In this manner, only subsets of RD initiators can be reset while others continue in active operation. For example, in the illustrated embodiment, if domain 2 resets, then only those RD initiators allocated to domain 2 are reset, while those allocated to domain 1 are not and can thus remain operational.

Referring back to FIG. 2, RD 106 also includes a MUX 206 which receives the domain 1 reset at a first data input and the domain 2 reset at a second data input. A control input of MUX 206 receives an indicator 224 from RD ownership registers 216 which identifies the primary initiator. In the illustrated embodiment, the primary initiator is domain 1, therefore, MUX 206, based on indicator 224, selects the domain 1 reset to provide as reset 234 to RD interconnect 146, to the RD peripherals (by way of RD peripheral bus 150), and to any circuitry that is common to the responder domain (such as bridge 148). Note that if domain 2 is the primary initiator, then the domain 2 reset will be routed via MUX 206 and reset the RD interconnect and other resources when domain 2 is reset. Also, note that when the primary domain resets, everything in RD 106 resets, regardless of the allocations provided by registers 208 and 214. In one embodiment, when the primary domain resets, all of system 100 resets.

RD control circuit 126 also includes interrupt steering control circuit 218 which routes interrupts from RD peripherals (such as interrupt 226 from RD peripheral 152 or interrupt 228 from RD peripheral 154) to the appropriate initiator domain according to the information in RD peripheral allocation register 214. (Alternatively, a separate register may be used to provide initiator domain allocations for different types of interrupts.) For example, interrupts from RD peripherals allocated to domain 1 can be provided to domain 1 via connection 236 and those from RD peripherals allocated to domain 2 can be provided to domain 2 via connection 238. In the appropriate initiator domain, interrupts can be provided to an interrupt controller (such as interrupt controller 112 in domain 2 and interrupt controller 124 in domain 1). These interrupts may be hardware interrupts, such as, for example, an SPI interrupt, an I$^2$S interrupt, etc. Interrupt steering control circuit 218 may also include DMA steering circuitry (e.g., including a separate register for DMA interrupt allocations) to route DMA interrupts per channel to the appropriate initiator domain to which the DMA interrupt is allocated.

In one embodiment, the primary initiator may be changed such that a different initiator domain becomes the primary initiator which configures and controls RD 106. In this case, clocks to RD 106 should be gated prior to changing the primary domain designation. However, whichever domain is the primary domain, it needs to remain "on" so as to properly control the RD 106.

Therefore, by now it should be appreciated that there has been provided an asymmetric multi-core system (e.g. an SoC) which includes, in addition to any number of initiator domains, at least one responder domain (in which the responder domain can only respond to requests from initiator domains or initiate transactions on behalf of an initiator domain to complete a response but cannot generate original or high level requests to any initiator domains). The resources of the responder domain can be allocated to any of the initiator domains within the system, and is controlled by one initiator domain designated as the primary domain. The responder domain, which does not operate in accordance with a complete OS, follows the power modes of the initiator domains. However, by allocating the resources of the responder domain to different initiator domains, the responder domain is capable of operating within multiple operating systems. Also, by using the allocations of the resources to different initiator domains, a reset can be performed on a subset of resources allocated to a particular initiator domain which is being reset, while the remaining resources allocated to initiator domains not being reset remain functioning.

The conductors as discussed or illustrated herein may be described or illustrated in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing architecture (e.g. an exemplary SoC), this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, any of the domains as illustrated in FIG. 1 may include fewer, different, or additional elements than those illustrated. For example, hardware firewalls may exist at the boundaries of each domain (e.g. of each initiator domain and responder domain). Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, an integrated circuit includes a primary initiator domain (ID) circuit including: a processor core, a responder domain (RD) control circuit, and a reset controller; secondary ID circuits, each of the secondary ID circuits including: a processor core, and a reset controller; responder domain (RD) circuitry coupled to communicate with the primary ID circuit and the secondary ID circuits, the RD circuitry including: RD resource circuits; wherein the RD control circuit is configured to allocate each of the RD resource circuits to a first initiator domain consisting of the primary ID circuit or one of the secondary ID circuits, and when one of the secondary ID circuits enters a reset mode of operation, the RD resource circuit allocated to the one of the secondary ID circuits enters a reset while the remaining RD resource circuits are not affected by the reset. In one aspect, the processor core in the primary ID circuit runs a first operating system; and the processor core in at least one of the secondary ID circuits runs a second operating system, wherein the first operating system is a real-time operating system and the second operating system is an application domain operating system. In another aspect, the primary ID circuit has a first operating system, the secondary ID circuit has a second operating system, different from the first operating system, and the RD circuitry does not have its own operating system, wherein: the primary ID circuit and the secondary ID circuits issue requests and responses; and the RD resource circuits only respond to requests initiated by the primary or secondary ID circuits. In yet another aspect, the RD control circuit is further is configured to reallocate the one of the RD resource circuits to a second initiator domain consisting of the primary ID circuit or one of the secondary ID circuits, the first initiator domain being different than the second initiator domain. In a further aspect, the RD control circuit is further configured to reallocate the one of the RD resource circuits when the first initiator domain to which the one of the RD resource circuits is allocated is one of the secondary ID circuits and the one of the secondary ID circuits is switching contexts. In another aspect of the embodiment, the RD resource circuits include RD peripheral circuits, wherein: the primary ID circuit and the secondary ID circuits include an interrupt controller circuit, and interrupts within the RD peripheral circuits are routed to the primary and secondary ID circuits based on the allocations of the RD resource circuits in the RD control circuit. In another aspect, the RD circuitry follows power modes of the primary ID circuit. In yet another aspect, the RD resource circuits follow power modes of the primary or secondary ID circuit to which they are allocated. In another aspect, the RD resource circuits include RD initiator circuits wherein the RD control circuit includes an RD initiator allocation register, each field of the RD initiator allocation register corresponds to an RD initiator circuit of the RD circuitry, and is set to allocate the RD initiator circuit to an initiator domain. In yet another aspect, wherein the RD resource circuits include RD peripheral circuits wherein the RD control circuit further includes an RD peripheral allocation register, each field of RD peripheral allocation register corresponds to one of the RD peripheral circuits, wherein the RD peripheral allocation register is set to allocate at least some of the RD peripheral circuits to one of the primary or secondary ID circuits. In a further aspect, the RD resource circuits further includes RD initiator circuits; the RD control circuit further includes an RD initiator allocation register (208), each field of RD initiator allocation register corresponds to one of the RD initiator circuits, wherein the RD initiator allocation register is set to allocate at least some of the RD initiator circuits to a corresponding one of the primary or secondary ID circuits. In yet a further aspect, the RD circuitry further includes initiator multiplexers, each of the initiator multiplexers coupled to one of the RD initiator circuits, and including a first input to receive a reset signal from one of the secondary ID circuits, a second input to receive a reset signal from the primary ID circuit, and a control input from the RD initiator allocation register. In another further aspect, the RD control circuit further includes an interrupt steering control circuit coupled to the RD peripheral allocation register, the interrupt steering control circuit steers interrupts from the RD peripheral circuits to the primary or one of the secondary ID circuits based on information in the RD peripheral allocation register. In another further aspect, the RD circuitry further includes a responder multiplexer coupled to the RD peripheral circuits, and including a first input to receive a reset signal from one of the secondary ID circuits, a second input to receive a reset signal from the primary ID circuit, and a control input froma register which identifies an initiator domain as the primary initiator domain.

In another embodiment, a method of sharing responder resources in an asymmetric processing system includes: in a responder domain (RD) control circuit in a primary initiator domain (ID) circuit, allocating RD resource circuits in an RD circuit to one of the primary ID circuit or a secondary ID circuit, wherein the primary and secondary ID circuit issue requests and responses, and the RD resource circuits initiate transactions on behalf of an ID circuit or issue responses; when one of the RD resource circuits is allocated to the secondary ID circuit, controlling a reset status of only the one of the RD peripheral circuits based on the reset status of the secondary ID circuit. In one aspect, the method further includes, when another one of the RD resource circuits is allocated to the primary ID circuit, controlling a reset status of the another one of the RD resource circuits based on the reset status of the primary ID circuit. In another aspect, the RD resource circuits include RD peripheral circuits, and the method further includes communicating interrupts from the RD peripheral circuits to an interrupt steering control circuit in the RD control circuit; and communicating the interrupts from the RD control circuit to the primary and secondary ID circuits based on allocations of the RD resource circuits to the primary and secondary ID circuits. In another aspect, the method further includes running a real-time operating system in the primary ID circuit; and running an application operating system in the secondary ID circuit. In yet another aspect, the method further includes reallocating, by the RD control circuit, one of the RD resource circuits from the secondary ID circuit to the primary ID circuit, from the primary ID circuit to the secondary ID circuit, or from the secondary ID circuit to another secondary ID circuit. In another aspect, the method further includes reallocating, by the RD control circuit, the one of the RD resource circuits to the primary ID circuit or another secondary ID circuit when the secondary ID circuit switches context.

The invention claimed is:
1. An integrated circuit comprising:
a primary initiator domain (ID) circuit including:
    a processor core,
    a responder domain (RD) control circuit, and
    a reset controller;
secondary ID circuits, each of the secondary ID circuits including:
    a processor core, and
    a reset controller;
responder domain (RD) circuitry coupled to communicate with the primary ID circuit and the secondary ID circuits, the RD circuitry including:
    RD resource circuits, wherein the RD resource circuits include RD peripheral circuits;
wherein the RD control circuit is configured to allocate each of the RD resource circuits to a first initiator domain consisting of the primary ID circuit or one of the secondary ID circuits, and when one of the secondary ID circuits enters a reset mode of operation, the RD resource circuit allocated to the one of the secondary ID circuits enters a reset while the remaining RD resource circuits are not affected by the reset, and
wherein the primary ID circuit and the secondary ID circuits include an interrupt controller circuit, and interrupts within the RD peripheral circuits are routed to the primary and secondary ID circuits based on the allocations of the RD resource circuits in the RD control circuit.

2. The integrated circuit of claim 1 wherein:
the processor core in the primary ID circuit runs a first operating system;
the processor core in at least one of the secondary ID circuits runs a second operating system, wherein the first operating system is a real-time operating system and the second operating system is an application domain operating system.

3. The integrated circuit of claim 1 wherein the primary ID circuit has a first operating system, the secondary ID circuit has a second operating system, different from the first operating system, and the RD circuitry does not have its own operating system, wherein:
the primary ID circuit and the secondary ID circuits issue requests and responses; and
the RD resource circuits only respond to requests initiated by the primary or secondary ID circuits.

4. The integrated circuit of claim 1 wherein:
the RD control circuit is further is configured to reallocate one of the RD resource circuits to a second initiator domain consisting of the primary ID circuit or one of the secondary ID circuits, the first initiator domain being different than the second initiator domain.

5. The integrated circuit of claim 1 wherein:
the RD circuitry follows power modes of the primary ID circuit.

6. The integrated circuit of claim 1 wherein:
the RD resource circuits follow power modes of the primary or secondary ID circuit to which they are allocated.

7. An integrated circuit comprising:
a primary initiator domain (ID) circuit including:
a processor core,
a responder domain (RD) control circuit, and
a reset controller;
secondary ID circuits, each of the secondary ID circuits including:
a processor core, and
a reset controller;
responder domain (RD) circuitry coupled to communicate with the primary ID circuit and the secondary ID circuits, the RD circuitry including:
RD resource circuits;
wherein the RD control circuit is configured to allocate each of the RD resource circuits to a first initiator domain consisting of the primary ID circuit or one of the secondary ID circuits, and when one of the secondary ID circuits enters a reset mode of operation, the RD resource circuit allocated to the one of the secondary ID circuits enters a reset while the remaining RD resource circuits are not affected by the reset,
wherein the RD control circuit is further is configured to reallocate one of the RD resource circuits to a second initiator domain consisting of the primary ID circuit or one of the secondary ID circuits, the first initiator domain being different than the second initiator domain, when the first initiator domain to which the one of the RD resource circuits is allocated is one of the secondary ID circuits and the one of the secondary ID circuits is switching contexts.

8. An integrated circuit comprising:
a primary initiator domain (ID) circuit including:
a processor core,
a responder domain (RD) control circuit, and
a reset controller;
secondary ID circuits, each of the secondary ID circuits including:
a processor core, and
a reset controller;
responder domain (RD) circuitry coupled to communicate with the primary ID circuit and the secondary ID circuits, the RD circuitry including:
RD resource circuits;
wherein the RD control circuit is configured to allocate each of the RD resource circuits to a first initiator domain consisting of the primary ID circuit or one of the secondary ID circuits, and when one of the secondary ID circuits enters a reset mode of operation, the RD resource circuit allocated to the one of the secondary ID circuits enters a reset while the remaining RD resource circuits are not affected by the reset,
wherein the RD resource circuits include RD initiator circuits wherein:
the RD control circuit includes an RD initiator allocation register, each field of the RD initiator allocation register corresponds to an RD initiator circuit of the RD circuitry, and is set to allocate the RD initiator circuit to an initiator domain.

9. An integrated circuit comprising:
a primary initiator domain (ID) circuit including:
a processor core,
a responder domain (RD) control circuit, and
a reset controller;
secondary ID circuits, each of the secondary ID circuits including:
a processor core, and
a reset controller;
responder domain (RD) circuitry coupled to communicate with the primary ID circuit and the secondary ID circuits, the RD circuitry including:
RD resource circuits;
wherein the RD control circuit is configured to allocate each of the RD resource circuits to a first initiator domain consisting of the primary ID circuit or one of the secondary ID circuits, and when one of the secondary ID circuits enters a reset mode of operation, the RD resource circuit allocated to the one of the secondary ID circuits enters a reset while the remaining RD resource circuits are not affected by the reset,
wherein the RD resource circuits include RD peripheral circuits wherein:
the RD control circuit further includes an RD peripheral allocation register, each field of RD peripheral allocation register corresponds to one of the RD peripheral circuits, wherein the RD peripheral allocation register is set to allocate at least some of the RD peripheral circuits to one of the primary or secondary ID circuits.

10. The integrated circuit of claim 9 wherein:
the RD resource circuits further includes RD initiator circuits;
the RD control circuit further includes an RD initiator allocation register (208), each field of RD initiator allocation register corresponds to one of the RD initiator circuits, wherein the RD initiator allocation register is set to allocate at least some of the RD initiator circuits to a corresponding one of the primary or secondary ID circuits.

11. The integrated circuit of claim 10 wherein:
the RD circuitry further includes:

initiator multiplexers, each of the initiator multiplexers coupled to one of the RD initiator circuits, and including a first input to receive a reset signal from one of the secondary ID circuits, a second input to receive a reset signal from the primary ID circuit, and a control input from the RD initiator allocation register.

12. The integrated circuit of claim 9, the RD control circuit further comprising:

an interrupt steering control circuit coupled to the RD peripheral allocation register, the interrupt steering control circuit steers interrupts from the RD peripheral circuits to the primary or one of the secondary ID circuits based on information in the RD peripheral allocation register.

13. The integrated circuit of claim 10 wherein the RD circuitry further includes:

a responder multiplexer coupled to the RD peripheral circuits, and including a first input to receive a reset signal from one of the secondary ID circuits, a second input to receive a reset signal from the primary ID circuit, and a control input from—a register which identifies an initiator domain as the primary initiator domain.

14. A method of sharing responder resources in an asymmetric processing system, the method comprising:

in a responder domain (RD) control circuit in a primary initiator domain (ID) circuit,
  allocating RD resource circuits in an RD circuit to one of the primary ID circuit or a secondary ID circuit, wherein the primary and secondary ID circuit issue requests and responses, the RD resource circuits initiate transactions on behalf of an ID circuit or issue responses, and the RD resource circuits include RD peripheral circuits;
  when one of the RD resource circuits is allocated to the secondary ID circuit, controlling a reset status of only the one of the RD peripheral circuits based on the reset status of the secondary ID circuit;
  communicating interrupts from the RD peripheral circuits to an interrupt steering control circuit in the RD control circuit; and
  communicating the interrupts from the RD control circuit to the primary and secondary ID circuits based on allocations of the RD resource circuits to the primary and secondary ID circuits.

15. The method of claim 14 further comprising:

when another one of the RD resource circuits is allocated to the primary ID circuit, controlling a reset status of the another one of the RD resource circuits based on the reset status of the primary ID circuit.

16. The method of claim 14 further comprising:

running a real-time operating system in the primary ID circuit; and running an application operating system in the secondary ID circuit.

17. The method of claim 14 further comprising:

reallocating, by the RD control circuit, one of the RD resource circuits from the secondary ID circuit to the primary ID circuit, from the primary ID circuit to the secondary ID circuit, or from the secondary ID circuit to another secondary ID circuit.

18. A method of sharing responder resources in an asymmetric processing system, the method comprising:

in a responder domain (RD) control circuit in a primary initiator domain (ID) circuit,
  allocating RD resource circuits in an RD circuit to one of the primary ID circuit or a secondary ID circuit, wherein the primary and secondary ID circuit issue requests and responses, the RD resource circuits initiate transactions on behalf of an ID circuit or issue responses;
  when one of the RD resource circuits is allocated to the secondary ID circuit, controlling a reset status of only the one of the RD peripheral circuits based on the reset status of the secondary ID circuit; and
  reallocating, by the RD control circuit, the one of the RD resource circuits to the primary ID circuit or another secondary ID circuit when the secondary ID circuit switches context.

* * * * *